(12) United States Patent
Ueno et al.

(10) Patent No.: US 8,236,421 B2
(45) Date of Patent: Aug. 7, 2012

(54) METALLIC STRUCTURE AND PHOTODETECTOR

(75) Inventors: Kosei Ueno, Hokkaido (JP); Hiroaki Misawa, Hokkaido (JP); Dai Ohnishi, Kyoto (JP); Takui Sakaguchi, Kyoto-Fu (JP); Yoichi Mugino, Kyoto (JP)

(73) Assignees: Rohm Co., Ltd., Kyoto (JP); National University Corporation Hokkaido University, Hokkaido (JP)

( * ) Notice: Subject to any disclaimer, the term of this patent is extended or adjusted under 35 U.S.C. 154(b) by 0 days.

(21) Appl. No.: 13/179,168

(22) Filed: Jul. 8, 2011

(65) Prior Publication Data

US 2011/0266414 A1    Nov. 3, 2011

Related U.S. Application Data

(62) Division of application No. 12/230,622, filed on Sep. 2, 2008, now Pat. No. 8,088,484.

(30) Foreign Application Priority Data

Sep. 3, 2007 (JP) ................................. 2007-228159
Sep. 3, 2007 (JP) ................................. 2007-228160

(51) Int. Cl.
*B32B 5/66* (2006.01)
(52) U.S. Cl. ........ 428/403; 428/404; 428/405; 428/406; 428/407; 250/458.1; 250/458.2
(58) Field of Classification Search ............... 250/458.1, 250/458.2; 428/403–407
See application file for complete search history.

(56) References Cited

U.S. PATENT DOCUMENTS 7,709,810 B2 * 5/2010 Misawa et al. ............. 250/458.1
7,824,761 B2 * 11/2010 Misawa et al. ................. 428/209
2006/0032529 A1   2/2006 Rand et al.
2008/0160287 A1 *  7/2008 Misawa et al. ................. 428/323

OTHER PUBLICATIONS

Hatta, A. et al, "Observation of the Enhanced Infrared Absorption of p-Nitrobenzoate on Ag Island Films with an ATR Technique", Applied Pysics A 29, pp. 71-75, 1982.
Thomas. K. George, et al., "Uniacial Plasmon Coupling through Longitudinal Self-Assembly of Gold Nanorods", J. Phys. Chem., B, vol. 108, No. 35, pp. 13066-13068, 2004.
Caswell, K. K., "Preferential End-to-End Assembly of Gold Nanorods by Biotin-Streptavidin Connectors", JACS Communications, vol. 125, No. 46, pp. 13914-13915, 2003.
Nihonkagakukai, Nihonkagakukai Dai 87 Shyunkinenkai—Kouenyokoshyu I, p. 235, Mar. 12, 2007.

* cited by examiner

*Primary Examiner* — Leszek Kiliman
(74) *Attorney, Agent, or Firm* — Rabin & Berdo, P.C.

(57) ABSTRACT

In a metallic structure including a metallic nano-chain with plasmon resonance absorption, a metallic nanoparticle forming the metallic nano-chain is formed in a circular, triangle, or rhomboid shape. The wavelength selectivity can be increased also by forming a closed region by mutually linking all of metallic nanoparticles that are mutually linked with bottlenecks. In a photodetector, a photodetection unit including a current detection probe, a nano-chain unit, and a current detection probe is arranged on a substrate. The nano-chain unit is a metallic structure with plasmon resonance absorption, where metallic nanoparticles are mutually linked with bottlenecks. Each current detection probe has a corner whose tip is formed with a predetermined angle, and this corner is arranged to face the tip of the nano-chain unit, i.e., a corner of the metallic nanoparticle. Photodetection with high wavelength selectivity is performed based on a change in the initial voltage of the current-voltage characteristic.

6 Claims, 14 Drawing Sheets

| NUMBER OF METALLIC NANOPARTICLES n | LENGTH OF METALLIC STRUCTURE x (μm) | NUMBER OF METALLIC NANOPARTICLES n | LENGTH OF METALLIC STRUCTURE x (μm) |
|---|---|---|---|
| 1 | 0.14 | 7 | 0.96 |
| 2 | 0.28 | 8 | 1.10 |
| 3 | 0.42 | 9 | 1.24 |
| 4 | 0.55 | 10 | 1.37 |
| 5 | 0.69 | 15 | 2.06 |
| 6 | 0.83 | 20 | 2.74 |
|  |  | 25 | 3.43 |

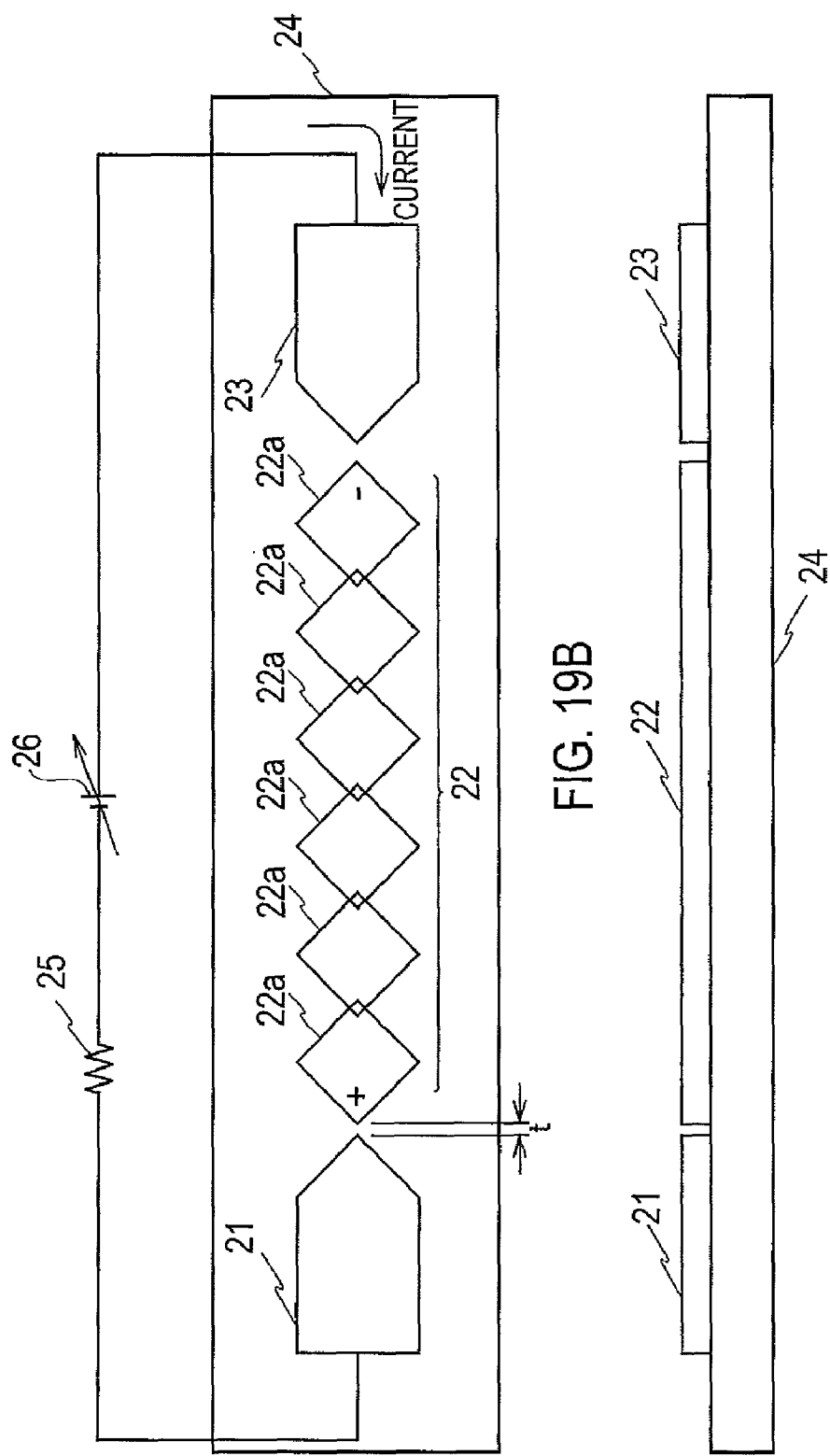

METALLIC STRUCTURE AND PHOTODETECTOR

CROSS REFERENCE TO RELATED APPLICATIONS AND INCORPORATION BY REFERENCE

This application is a divisional of application Ser. No. 12/230,622, filed on Sep. 2, 2008. Furthermore, this application is based upon and claims the benefit of prior Japanese Patent Application P2007-228159 filed on Sep. 3, 2007 and P2007-228160 filed on Sep. 3, 2007; the entire contents of which are incorporated by reference herein.

BACKGROUND OF THE INVENTION

1. Field of the Invention

The present invention relates to a metallic structure with plasmon resonance absorption and a photodetector.

2. Description of the Related Art

A fine metallic body (e.g., a metallic microparticle having a nanometer size) may exhibit an optical response called "local (surface) plasmon resonance absorption" in a specific wavelength region among broad wavelength regions ranging from the visible to infrared regions, depending on the shape or size of the metallic body. The examples of the metal exhibiting the local plasmon resonance absorption include noble metals, such as gold, silver, and platinum; however, even if the metal type is the same, if the size or shape of the metal differs, the local plasmon resonance absorption wavelength also differs. Attempts have been made to apply, to various optical devices, the nature that the absorption wavelength varies depending on a difference in size or shape of fine metallic bodies.

A metallic structure having a plurality of fine metallic bodies arranged in a substrate may have the plasmon resonance absorption in a broad region ranging from the visible to the infrared region, based on the principle of the local (surface) plasmon. In attempting to apply such metallic structure to an optical device or a sensor, it is important to adjust the wavelength region of this plasmon resonance absorption.

Moreover, for example, as shown in "*Applied Physics A*, vol. 29, pp. 71-75 (1982)," a phenomenon in which infrared absorption is enhanced by an optical electric field enhancement phenomenon via the plasmon at the surface of a metallic structure has been found. However, the mechanism thereof has not been clarified yet, and a quantitative measurement method or the like of the enhanced absorption has not been established yet, either. Therefore, if a metallic structure having a plasmon resonance frequency in a desired infrared region can be fabricated, an optical device or measurement system using the above-described phenomenon can be constructed.

The wavelength region of the plasmon resonance absorption which the above-described metallic structure has is affected by the "slenderness (the aspect ratio if the fine metallic body is rod-shaped)" of the fine metallic body. In other words, if a slender (the aspect ratio is high) fine metal is used, the wavelength region of the plasmon resonance absorption shifts to the long wavelength side, while if a short (the aspect ratio is low) fine metal is used, the wavelength region of the plasmon resonance absorption shifts to the short wavelength side.

On the other hand, for example, as shown in "*J. Phys. Chem. B*, 108, 13066 (2004)" and "*JACS*, 125, 13915 (2003)," techniques for chemically bonding and linking a plurality of rod-shaped nano metallic (gold: Au) bodies are known. The nano metallic bodies linked by a chemical bond (e.g., streptavidin-biotin interaction) are coupled via a chemical substance, which is not a metal, and strictly speaking, the nano metallic bodies are not directly linked to each other.

As described above, in order to obtain a metallic structure having the plasmon resonance absorption on the long wavelength side (e.g., infrared region), it is necessary to form a slender fine metallic body (e.g., a rod-shaped fine metallic body having a high aspect ratio). However, a single slender fine metallic body would cause a multi-mode absorption to deteriorate the wavelength selectivity, causing a problem in use in an optical device or the like. Then, it is contemplated that a metallic structure linking the nano metallic bodies is formed to improve the wavelength selectivity.

However, even with the metallic structure made by linking the nano metallic bodies, the absorption peak width of plasmon resonance absorption is not become very sharp. In order to increase the wavelength resolution and improve the wavelength selectivity further, the absorption peak width is expected to be sharpened further.

On the other hand, a photodetector has not been achieved yet that uses a metallic structure having the resonance wavelength of local plasmon on the long wavelength side while not exhibiting a multi-mode absorption (i.e., wavelength selectivity is high), and that achieve the detection of light in the terahertz region.

SUMMARY OF THE INVENTION

The present invention has been made to solve the above-described problems. It is an object of the present invention to provide a metallic structure and a photodetector having a plasmon resonance absorption effect and improved wavelength selectivity.

In order to achieve the above-described object, the invention according to claim 1 is a metallic structure including a metallic nano-chain with plasmon resonance absorption, in which the metallic nano-chain is formed a plurality of metallic nanoparticles mutually linked with a plurality of bottlenecks, and each of the metallic nanoparticles is formed in any one of a circular shape, a triangle shape, and a rhomboid shape.

Moreover, the invention according to claim 2 is the metallic structure according to claim 1, in which the plurality of bottlenecks linking the metallic nanoparticles are arranged on a straight line.

Moreover, the invention according to claim 3 is the metallic structure according to claim 1, in which a plurality of bottlenecks linking the metallic nanoparticles are arranged on a polygonal line.

Moreover, the invention according to claim 4 is the metallic structure according to claim 3, in which the lengths of the respective straight line portions in the polygonal line are formed so as to differ from each other.

Moreover, the invention according to claim 5 is the metallic structure according to claim 1, in which the metallic nano-chain is arranged on a substrate.

Moreover, the invention according to claim 6 is a metallic structure including a metallic nano-chain with plasmon resonance absorption, in which the metallic nano-chain is formed of a plurality of metallic nanoparticles mutually linked with a plurality of bottlenecks, and all of the plurality of metallic nanoparticles are linked to form a closed region.

According to the metallic structure of the present invention, since the shape of each of the metallic nanoparticles mutually linked with bottlenecks is formed in any one of a circular shape, a triangle shape, or a rhomboid shape, the shape of a plasmon resonance absorption peak spectrum can be sharpened and the wavelength resolution can be improved. On the other hand, also by forming a closed region by mutually linking all of the plurality of metallic nanoparticles that are mutually linked with bottlenecks, the shape of the plasmon resonance absorption peak spectrum can be sharpened and the wavelength resolution can be increased.

On the other hand, according to the photodetector of the present invention, since the wavelength selectivity is high, the light in the terahertz region can be detected precisely and the intensity of the light can be also detected.

BRIEF DESCRIPTION OF DRAWINGS

FIG. 19A and FIG. 19B are views showing a structure of a photodetector of the present invention.

FIG. 19B is irradiated with light and plasmon resonance absorption occurs.

DETAILED DESCRIPTION OF THE INVENTION

Figure 1A:
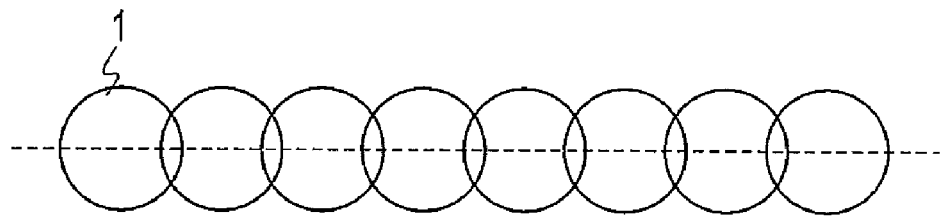
FIG. 1A to FIG. 1C are schematic views showing structural examples of a metallic nano-chain in a metallic structure of the present invention.
Figure 1B:
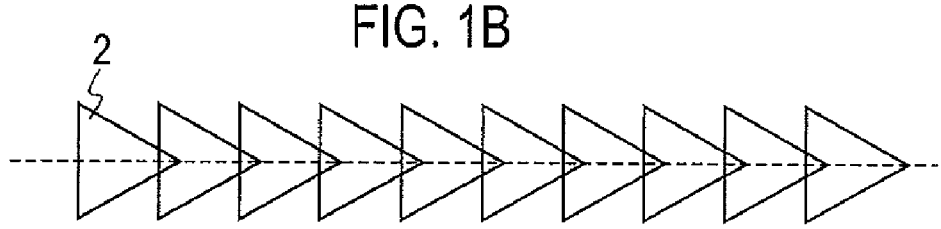
Figure 1C:
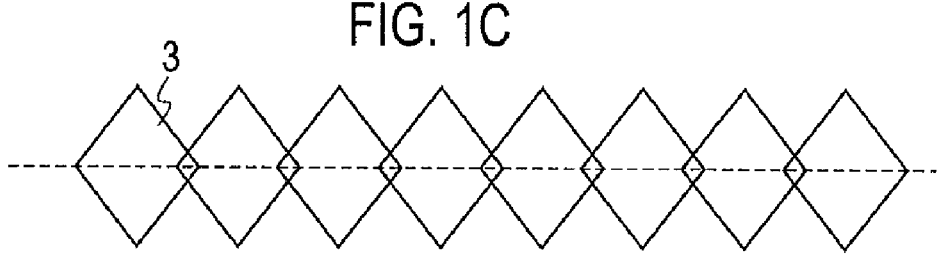

Hereinafter, one embodiment of the present invention will be described with reference to the accompanying drawings. FIG. 1A to FIG. 1C show plan views of metallic nano-chain units having a metallic structure of the present invention.

Figure 2:
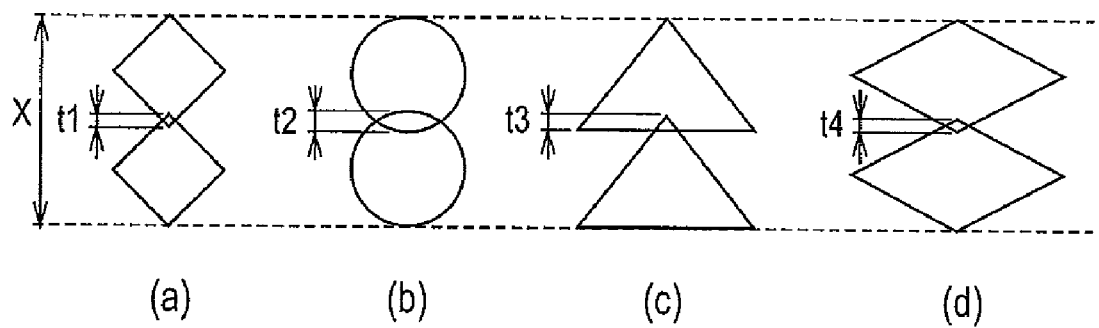
FIG. 2 is a schematic view showing the length of a bottleneck of each of metallic nano-chains.
Figure 3A:
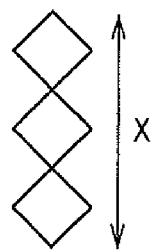
FIG. 3A is a schematic view showing the length of a metallic nano-chain.
Figure 3B:
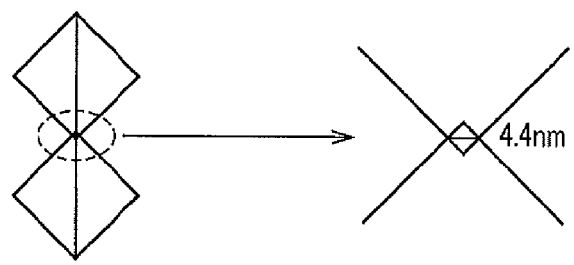
FIG. 3B is a schematic view showing the neck width of a bottleneck.

A metallic nano-chain is a metallic body with plasmon resonance absorption, wherein a plurality of metallic nanoparticles are mutually linked with bottlenecks. In FIG. 1A the plane shape of each metallic nanoparticle 1 is formed in a circular shape, in FIG. 1B the plane shape of each metallic nanoparticle 2 is formed in an isosceles triangular shape, and in FIG. 1C the plane shape of each metallic nanoparticle 3 is formed in a rhomboid shape. Here, the bottleneck indicates a portion where parts of the metallic nanoparticles are overlappingly formed as shown in FIG. 2 and FIG. 3B. Accordingly, one nanoparticle is slightly overlapped with an adjacent nanoparticle, thereby allowing a free electron contained in the one nanoparticle to move to the adjacent nanoparticle to a certain extent.

Moreover, the material of the metallic nanoparticle may be of any metal that provides surface plasmon absorption by being a nanoparticle, and the examples thereof include noble metals, such as gold, silver, and platinum. Moreover, the metallic nanoparticle may be a nano substance made from other material coated with such metal.

As described above, in the metallic nano-chain, a plurality of metallic nanoparticles are mutually linked with bottlenecks. When there are a plurality of bottlenecks in this manner (i.e., no less than three metallic nanoparticles are linked), the center of each of the bottlenecks is arranged on a straight line as indicated by a dotted line shown in FIG. 1A to FIG. 1C. As the arrangement method, the metallic nano-chain may be arranged so as to be horizontally symmetrical about the arrangement line of the bottleneck center as shown in FIG. 1A to FIG. 1C (vertically symmetrical in the view). However, instead of being horizontally symmetrical, if the shape of the metallic nanoparticle is triangle or the like, the base of each triangle may be linked on a straight line so as to arrange the triangle only on one side using the base as a border. In FIG. 1A to FIG. 1C, eight metallic nanoparticles are linked, however, since the bottleneck center is arranged on a straight line, a free electron can easily move between the microparticles through the respective bottlenecks.

Figure 4:
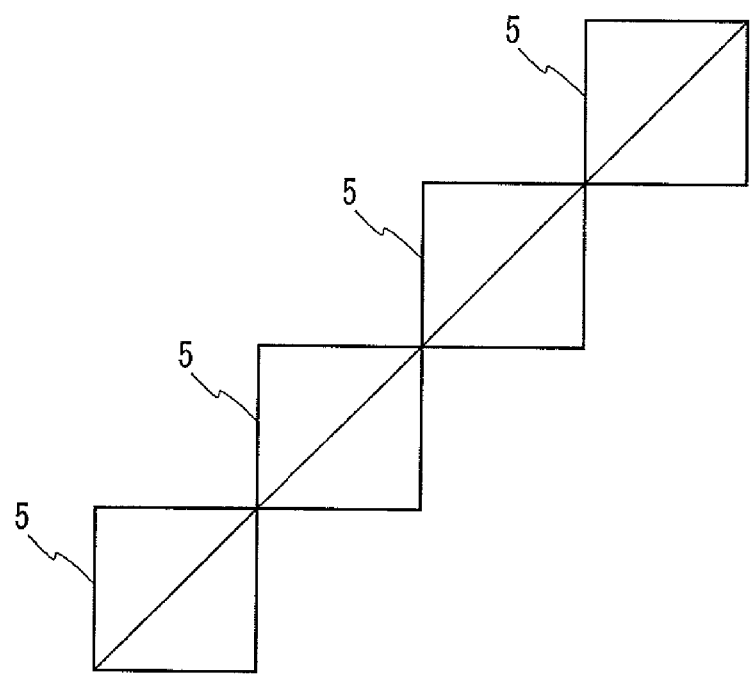
FIG. 4 is a schematic view showing a structural example of a metallic nano-chain.

On the other hand, FIG. 4 shows a case where the plane shape of each of the metallic nanoparticles forming a metallic nano-chain is formed in a square shape. A plurality of metallic nanoparticles 5 are mutually linked with bottlenecks. If this link has a plurality of bottlenecks (i.e., no less than three metallic nanoparticles are linked), the respective bottleneck centers are preferably arranged on a straight line as shown in FIG. 4. In FIG. 4, four metallic nanoparticles are linked, but the bottleneck centers arranged on a straight line would facilitate the movement of a free electron between the microparticles through the respective bottlenecks.

Since the metallic nanoparticle to be linked has a thickness, the shape in FIG. 1A is cylindrical, the shape in FIG. 1B is triangular prism shaped, the shape in FIG. 1C and FIG. 4 is square pole-shaped in terms of three-dimensional shape, respectively. When the shape of a metallic nanoparticle is triangular prism shaped or square pole shaped, the bottleneck is preferably formed by the metallic nanoparticles being linked to each other at their edge lines. This allows the neck width of the bottleneck to be reduced easily.

In forming a metallic nanoparticle on a substrate, the plane of the metallic nanoparticle is preferably arranged so as to be equal in level to the substrate surface. The volume of deposition of the metallic nanoparticle to be linked is preferably in the order of 100,000 $nm^3$ to 1,000,000 $nm^3$. Furthermore, the area of the metallic nanoparticle in a plan view is preferably in the order of 5,000 $nm^2$ to 20,000 $nm^2$. Moreover, the height of the metallic nanoparticle from the substrate is preferably in the order of 10 to 100 nm.

The number of metallic nanoparticles to be linked is preferably in the order of 2 to 50. Since the absorption resonance wavelength is proportional to the number of metallic nanoparticles, the number of metallic nanoparticles to be linked (the length of a metallic body extending through the bottlenecks) may be suitably selected in accordance with a desired resonance absorption wavelength.

In the metallic structure of the present invention, the metallic nanoparticle forming a metallic nano-chain is formed in either a circular shape, a triangle shape, or a rhomboid shape as shown in FIG. 1A to FIG. 1C, thereby sharpening the peak width of plasmon resonance absorption and improving the wavelength resolution.

Hereinafter, the experiment results of the wavelength resolution are described. FIG. 2 showed the bottleneck portion of the metallic nanoparticles having a different shape, wherein in FIG. 2(a) the plane shape of the metallic nanoparticle is a square shape, in FIG. 2(b) the plane shape of the metallic nanoparticle is a circular shape as in FIG. 1A, in FIG. 2(c) the plane shape of the metallic nanoparticle is an isosceles triangular shape as in FIG. 1B, and in FIG. 2(d) the plane shape of the metallic nanoparticle is a rhomboid shape as in FIG. 1C.

FIGS. 2(a), 2(b), 2(c), and 2(d) show the neck lengths t1, t2, t3, and t4 of the bottlenecks that link the metallic nanoparticles, where t1=t2=t3=t4=4.5 nm. The smaller the neck length, the further the multi-mode absorption of the metallic nano-chain is removed and the further the wavelength selectivity is improved. On the other hand, if the neck length is too small, the scattering of a plasmon electron in the vicinity of the bottleneck may become large. Moreover, also the number of links of the metallic nanoparticles of the metallic nano-chain is made the same, and the metallic nano-chain was configured so that the length X thereof at this time may be equal for each of FIGS. 2(a), 2(b), 2(c), and 2(d). When for example two metallic nanoparticles are linked as shown in FIG. 2, the length X is formed so as to be set to 282 nm, and the thickness of the metallic nanoparticle having each shape is set to 30 nm.

In order to actually fabricate the metallic nano-chain, a substrate serving as the base is required, and any substrate capable of arranging therein the metallic nanoparticles may be employed. Furthermore, the substrate is preferably a solid substrate, wherein at least the surface in which the metallic nanoparticles are arranged is made from an insulator. Moreover, the substrate is preferably a substrate made from a material that does not absorb light (e.g., light in the visible region to the near infrared region) incident from the outside, for example comprising a transparent substrate. Since the metallic nano-chain is manufactured using semiconductor fine processing techniques (e.g., electron beam lithography, sputtering, and the like) as described later, the substrate needs to withstand these processings. Accordingly, for example, a glass substrate, a quartz substrate, a sapphire substrate, and the like are used as the substrate.

Next, a manufacturing method in forming the metallic nano-chain on a substrate is described hereinafter with reference to FIG. 16. The metallic nano-chain is preferably manufactured using the semiconductor fine processing techniques. For example, as shown in FIG. 16(a), a substrate 4 is prepared, and the surface of the solid substrate 4 is coated with a resist 11 as shown in FIG. 16(b). Then a desired shape of the nano metallic body is drawn onto the resist 11 using an electron beam. Next, the drawn pattern is developed to expose the substrate in accordance with the shape of the nano metallic body, as shown in FIG. 16(c). Thereafter, as shown in FIG. 16(d), a metal is sputtered onto the developed surface to form a metal film 12, and then an unwanted metal film is removed along with the resist using lift-off to form a metallic nano-chain formed by linking the metallic nanoparticles, as shown in FIG. 16(e).

The method of manufacturing a metallic nano-chain can be carried out similarly to the method of manufacturing a metallic structure described in Japanese Patent Application No. 2005-080579 or Japanese Patent Application No. 2005-258364, for example. One of the important manufacturing conditions is the film thickness of the resist to be coated onto the substrate. This film thickness is preferably set to 200 nm or less. Moreover, it is preferable to reduce the concentration of a coating resist solution in order to reduce the film thickness.

Another one of the important manufacturing conditions is the exposing condition of the electron beam in the step of drawing a desired shape of a nano metallic body onto the resist using the electron beam. That is, it is preferable to increase the acceleration voltage of the electron beam and at the same time to reduce the exposure dose rate. More specifically, it is preferable to set the acceleration voltage of the electron beam to 100 kV to 200 kV and set the exposure dose rate to 2 $\mu C/cm^2$ or less.

Another one of the important manufacturing conditions is the development condition to remove the drawn resist, i.e., the development time in particular. Since the exposure dose rate is small, it is preferable to lengthen the development time, e.g., to carry out the development for about 30 minutes.

The plurality of bottleneck centers in the linked metallic nanoparticles are preferably arranged on a straight line as described above, however, as described later, the length of the overall metallic nano-chain on this straight line might be in the order of 0.2 μm to 4 μm, preferably in the order of 0.2 μm to 2.0 μm. The length of the metallic nano-chain is adjusted depending on the size of the metallic nanoparticles to be linked, the number of the metallic nanoparticles to be linked, or the like. If the length of the metallic nano-chain is lengthened, the plasmon resonance absorption wavelength of the metallic structure will shift to the long wavelength side.

Although the above contents is described in detail in Japanese Patent Application No. 2006-182637, the dependence of the plasmon resonance absorption wavelength particularly on the length X of the metallic nano-chain is shown below.

First, a metallic nano-chain was formed on a sapphire substrate as follows. The surface of the sapphire substrate (10 mm×10 mm) is ultrasonically cleaned for three minutes each using acetone, methanol, and ultra-pure water in this order. The positive type electron-beam resist (Zep-520a; made by Nippon Zeon Co., Ltd.) was spin-coated (at 4,000 rpm) onto the cleaned substrate surface to form a resist film (in the thickness of 200 nm). A desired pattern of a metallic nano-chain 2 was drawn at the dose rate of 1.2 μC/cm² using an electron beam exposure system with the acceleration voltage of 100 kV. The development was carried out for 30 minutes, and then the resultant substrate was rinsed and dried.

Next, gold (Au) was sputtered onto the substrate to form a metal film (40 nm). The substrate having the metal film formed thereon was immersed in a resist remover solution, and ultrasonic cleaning was carried out to remove the resist, and the remaining resist was lifted off.

Metal bodies having a shape linking 1 to 25 rectangular parallelepiped-shaped metallic nanoparticles were formed on the sapphire substrate, respectively, to obtain a metallic structure having a plurality of metallic nano-chains formed thereon. The composition of the metallic nanoparticle is gold (Au). Each metallic nanoparticle of each nano-block shaped metallic nano-chain was formed in a rectangular parallelepiped shape which has a square shape of 100 nm×100 nm when viewed from the upper surface of the substrate, and a height of 40 nm from the substrate. The bottleneck to be linked by the edge lines of the rectangular parallelepiped was formed to set the neck width of this bottleneck to 4.4 nm as shown in FIG. 3B. That is, in FIG. 2(a), the neck length in the direction perpendicular to t1 was set to 4.4 nm. The directions of the metallic nano-chains formed on the substrate were made the same, respectively, and the interval between the metallic nano-chains was set to 1,000 nm as a constant.

Figure 18A:
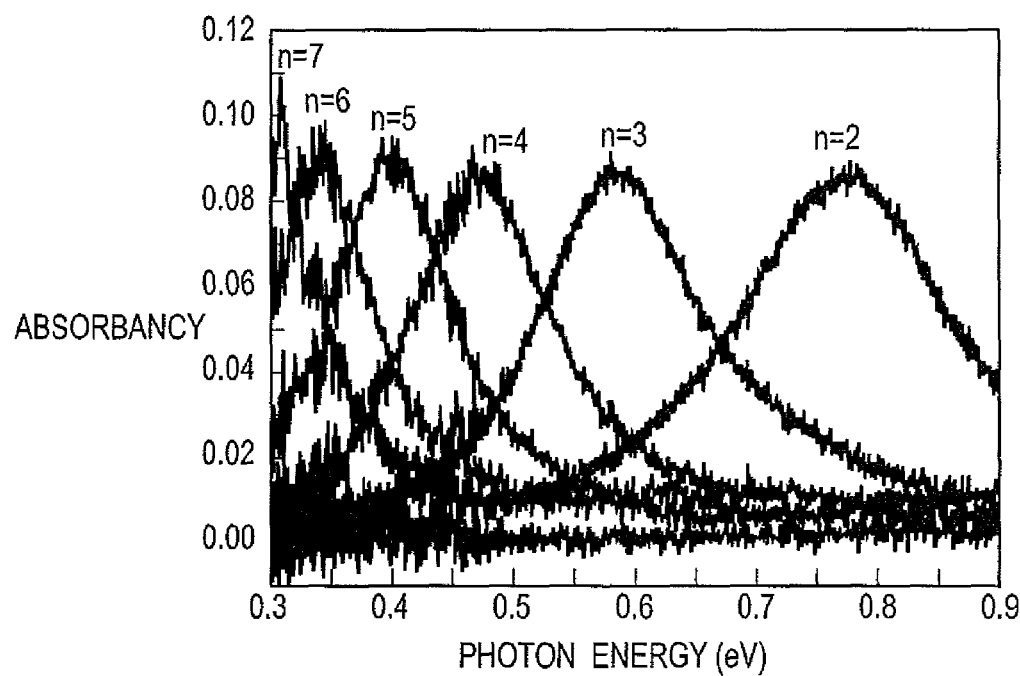
FIG. 18A and FIG. 18B are views showing the local plasmon bands of metallic nano-chains.
Figure 18B:
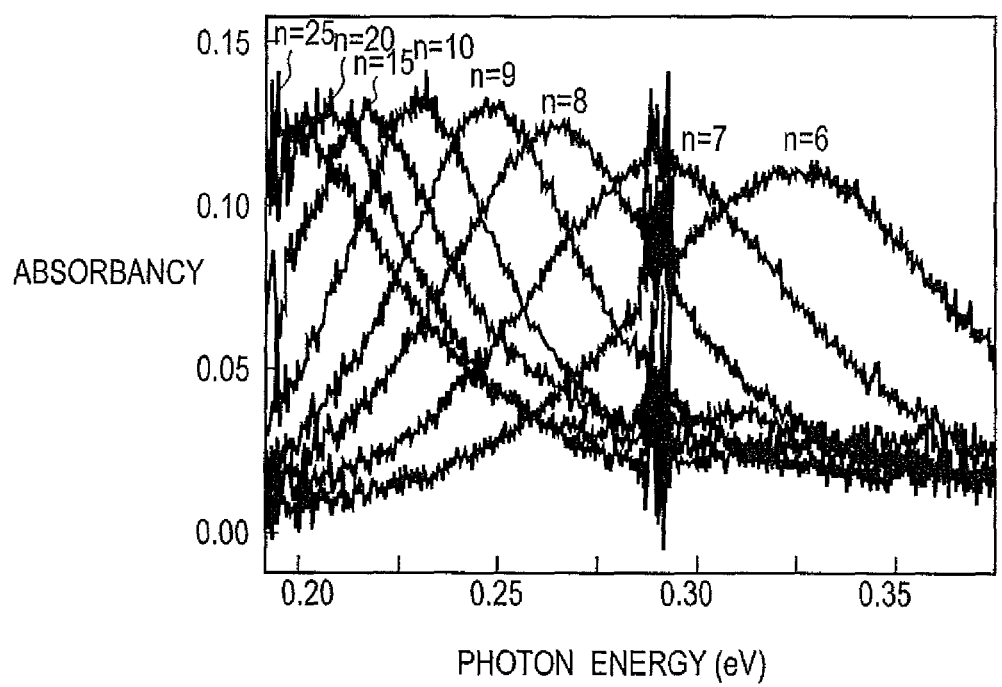

The respective metallic structures obtained through the above-described formation were irradiated from the upper surface with light having the wavelength of 660 nm to 7,142 nm (wave number of 15,000 cm$^{-1}$ to 1,400 cm$^{-1}$) to measure the absorbancy using a microscopic FT-IR measuring apparatus. The obtained results are shown in FIG. 18A and FIG. 18B. FIG. 18A shows the data of a metallic structure, in which metallic nano-chains whose number of linked metallic nanoparticles "n" is from 1 to 7 are arranged, while FIG. 18B shows the data of a metallic structure, in which the metallic nano-chains whose number of linked metallic nanoparticles "n" is from 6 to 25 are arranged. For the spectrum data of the metallic structure in which the metallic nano-chain whose number of metallic nanoparticles "n" is one is arranged, the peak thereof is not shown here, but this is because the peak exists outside the display area (on the higher energy side). The relationship between the number of metallic nanoparticles "n" and the length X of the metallic nano-chain is as shown in FIG. 17.

As shown in FIG. 18A and FIG. 18B, it can be seen that as the length X of the metallic body is lengthened by increasing the number of linked metallic nanoparticles "n", the half-value width of the spectrum decreases and light (light having a long wavelength) in the region having a smaller photon energy is absorbed. This may be because the resonance wavelength has shifted to the long wavelength side, thereby lengthening the phase relaxation time of plasmon.

As shown in FIG. 18A and FIG. 18B, for the metallic structure having the metallic nano-chain of linked metallic nanoparticles arranged therein, only dipole-mode plasmon resonance absorption was observed. This may be because only a plasmon resonance band based on a free electron traversing a nano-contact in the bottleneck is observed.

As described above, it was found that the wavelength of light to be resonantly absorbed can be varied by varying the length X of the metallic nano-chain.

Next, metallic nano-chains formed of the metallic nanoparticles shown in FIG. 1A to FIG. 1C were fabricated on the sapphire substrate, as described above. Moreover, for comparison, a metallic nano-chain formed of the square-shaped metallic nanoparticles shown in FIG. 2(a) and FIG. 4 was also fabricated. In this case, as described above, the neck lengths t1, t2, t3, and t4 of the bottlenecks shown in FIG. 2 were set as t1=t2=t3=t4=4.5 nm. Moreover, also the number of links of the metallic nanoparticles of the metallic nano-chain was made the same, and the metallic nano-chain was configured so that the length X thereof at this time may be equal for each of FIGS. 2(a), 2(b), 2(c), and 2(d). When two metallic nanoparticles are linked to each other as shown in FIG. 2, the metallic nano-chain is formed so that the length X is set to 282 nm, and the thickness of the metallic nanoparticle having each shape is set to 30 nm.

The respective metallic structures obtained through the above-described formation were irradiated from the upper surface with light having the wavelength of 660 nm to 7,142 nm (wave number of 15,000 cm$^{-1}$ to 1,400 cm$^{-1}$) to measure the absorbancy, using a microscopic FT-IR measuring apparatus. The obtained results are shown in FIG. 5 and FIG. 6.

Figure 5:
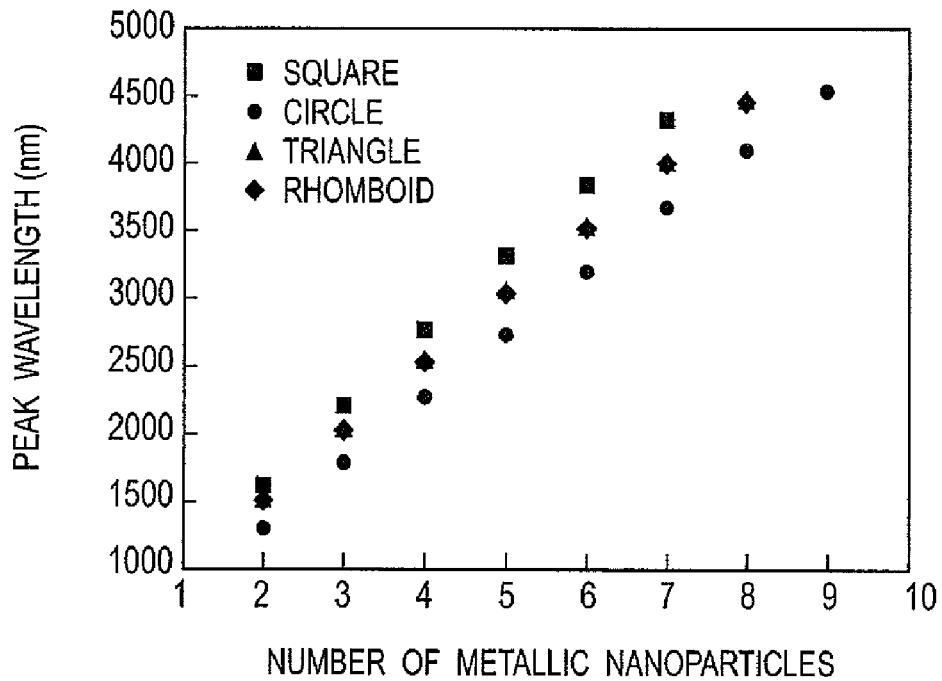
FIG. 5 is a view showing a relationship between the number of metallic nanoparticles and the peak wavelength when each of the metallic nano-chains of FIG. 2 is used.

The vertical axis of FIG. 5 represents the peak wavelength of the absorbed light, and the horizontal axis represents the number of metallic nanoparticles. Moreover, a filled square represents the data from the square-shaped metallic nanoparticle for comparison shown in FIG. 2(a), a filled circle represents the data from the metallic nano-chain of FIG. 1A, a filled triangle represents the data from the metallic nano-chain of FIG. 1B, and a filled rhomboid shape represents the data from the a metallic nano-chain of FIG. 1C. As the number of metallic nanoparticles increases and the length of the metallic nano-chain accordingly increases, the peak energy will decrease as described above and therefore the peak wavelength will increase.

Figure 6:
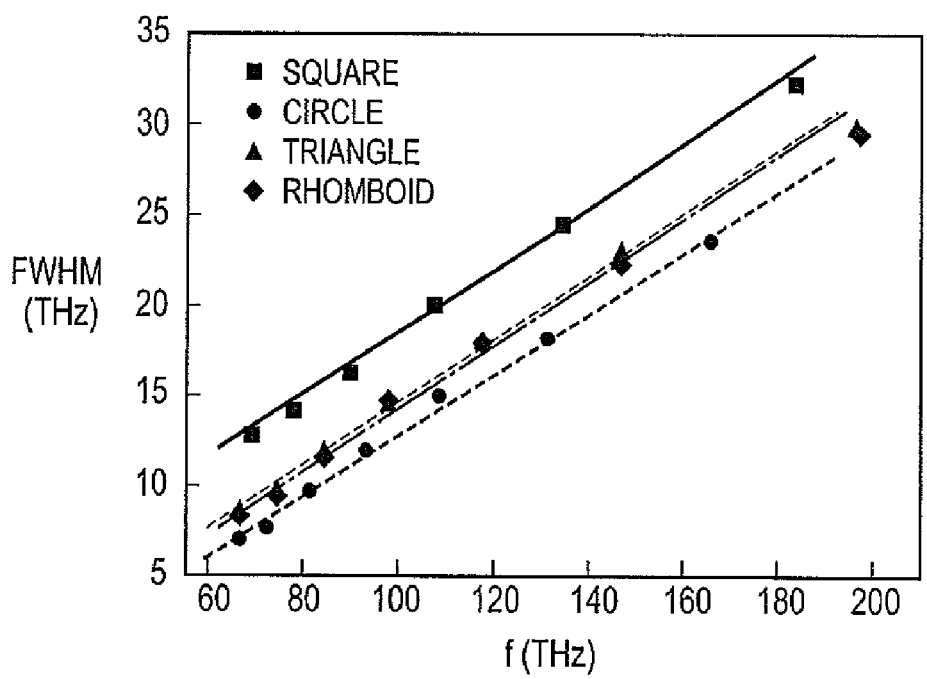
FIG. 6 is a view showing a relationship between the peak frequency corresponding to the data of FIG. 5 and the FWHM of a spectrum.

FIG. 6 is a graph of the FWHM (half-value width) of the peak frequency of the respective absorption spectra that were measured with respect to the data measured in FIG. 5. The vertical axis represents the FWHM (THz) and the horizontal axis represents the peak frequency f (THz). The data plotted in FIG. 6 corresponds to the data of FIG. 5. Here, as the number of metallic nanoparticles increases, the peak wavelength increases while the peak frequency decreases. Therefore the direction of the horizontal axis of FIG. 6 corresponds to a sequence from the data for a large number of metallic nanoparticles to the data for a small number of metallic nanoparticles.

It can be seen that in the case of the square-shaped metallic nanoparticle (data indicated by the filled square in the view), the FWHM is rather large across the detected peak frequencies as compared with the case where the circular, triangular, or rhomboid-shaped metallic nanoparticle is used. By forming the planar shape of the metallic nanoparticle constituting the metallic nano-chain in either a circular shape, a triangular shape, or a rhomboid shape in this way, narrower band of wavelengths can be absorbed as compared with the case where the square-shaped metallic nanoparticle is used. On the other hand, if the square shape is selected, broad band of wavelengths can be absorbed. The shape of the nanoparticle may be suitably selected in accordance with a desired wavelength resolution.

Figure 7A:
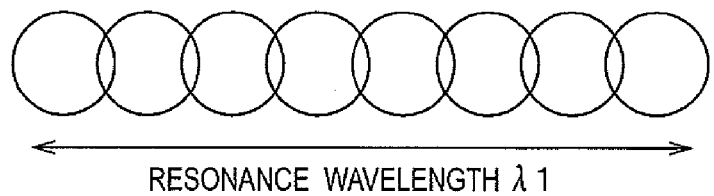
FIG. 7A to FIG. 7B are schematic views showing a bending structure of a metallic nano-chain.

Next, a structure having a plurality of plasmon resonance absorption wavelengths (peak wavelengths), instead of one plasmon resonance absorption wavelength, caused by the metallic nano-chain is described below. FIG. 7A shows a metallic nano-chain structure having one resonance absorption wavelength $\lambda 1$, while FIG. 7B shows a metallic nano-chain structure having a plurality of resonance absorption wavelengths $\lambda 1$, $\lambda 2$, and $\lambda 3$.

The structure of FIG. 7A is the same as that of FIG. 1A described above, wherein the resonance absorption wavelength λ1 is determined by the length of the metallic nano-chain, and there is only one resonance wavelength. However, if the bottlenecks are arranged not on a straight line but on a polygonal line as shown in FIG. 7B, the resonance absorption wavelengths λ2, λ3 corresponding to the lengths of the straight line portions in the polygonal line are additionally generated. Here, λ1>λ2 and λ1>λ3. Then, in such a case as in FIG. 7B, the absorption peak appears at three places λ1, λ2, and λ3 including the absorption wavelength λ1 that is based on the length of the overall polygonal line. In this manner, even in a narrow region, a metallic nano-chain having sensitivity at a plurality of wavelengths can be fabricated.

Figure 7B:
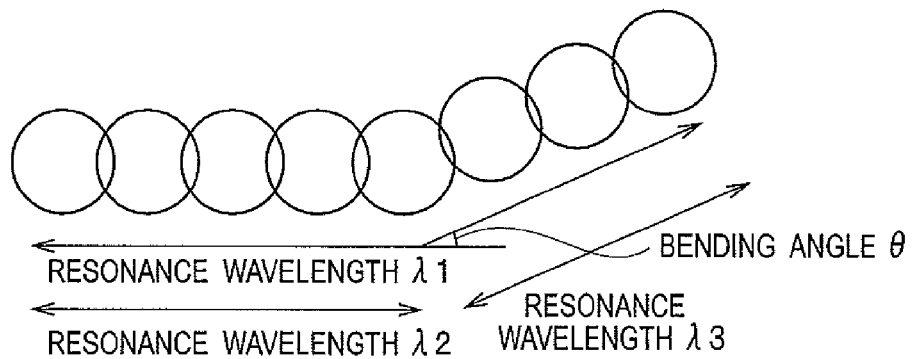
Figure 9:
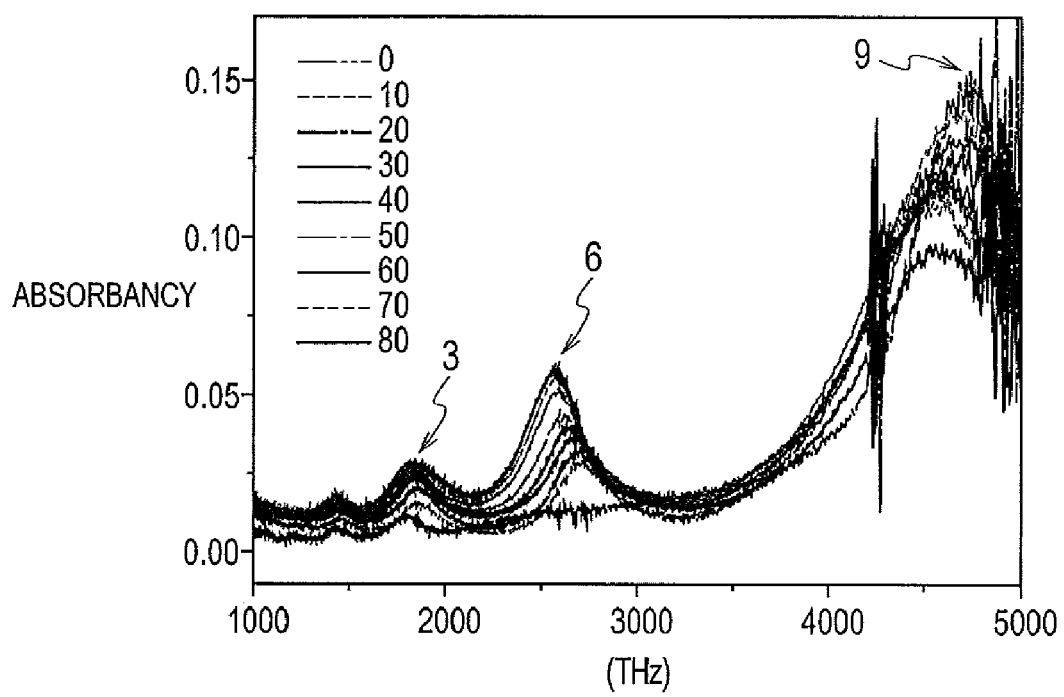
FIG. 9 is a view showing a relationship between a resonance absorption frequency and the absorbancy of a metallic nano-chain having a bending structure.

FIG. 9 shows that the bending angle θ shown in FIG. 7B produces a change in the intensity of the resonance absorption peak. The shape of the metallic nanoparticle was circle as in FIG. 7B, and the number of metallic nanoparticles constituting the metallic nano-chain was set to nine. Moreover, the bottlenecks of six metallic nanoparticles were linearly linked, and, in order to have the bending angle θ with respect to this straight line, the bottlenecks of other three metallic nanoparticles were arranged on a straight line. The bending angle θ was varied from 0 to 80 degrees by 10 degrees intervals. Moreover, three numbers shown on each peak represent the numbers of the metallic nanoparticles. In this way, the resonance absorption wavelength corresponding to the length of each straight line portion of the polygonal line (i.e., corresponding to the length of each metallic nano-chain when each metallic nano-chain comprises three, six, or nine metallic nanoparticles) will appear. Here, if particularly the peak of the absorption wavelength 21 based on the length of the overall polygonal line is going to be strengthened, all the bottlenecks had better be arranged on a straight line if possible, and the bending angle θ is preferably set to 10 degrees or less.

Figure 8A:
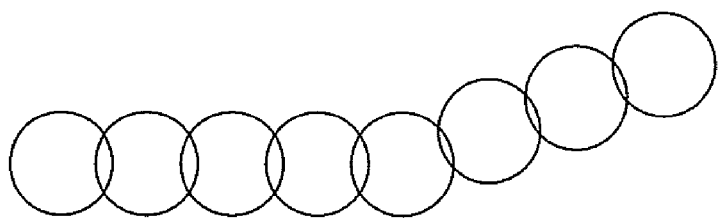
FIG. 8A to FIG. 8C are schematic views showing examples of the bending structure of a metallic nano-chain.
Figure 8B:
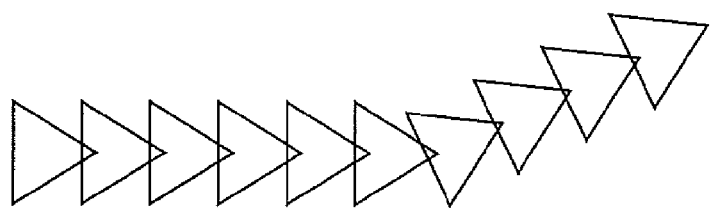
Figure 8C:
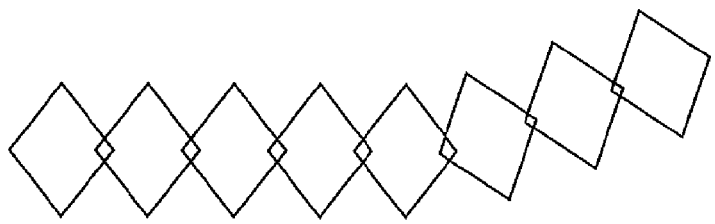

Moreover, as in FIG. 7B, the metallic nano-chain having a bending structure and having sensitivity at a plurality of wavelengths may comprise a metallic nanoparticle whose planar shape is formed in a triangular shape or a rhomboid shape as shown in FIG. 8B, FIG. 8C, other than in a circular shape. In this case, as in the data of FIG. 9, the metallic nano-chain can be formed so as to have sensitivity at a plurality of wavelengths.

Figure 10:
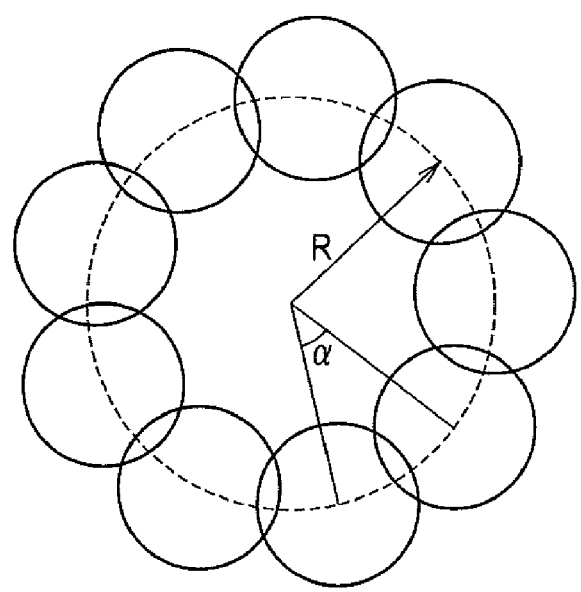
FIG. 10 is a schematic view showing a structural example when a metallic nano-chain has a closed region.

In FIG. 10, all the circular metallic nanoparticles are mutually linked with bottlenecks to form a closed region in the metallic nano-chain. In this embodiment, the closed region is formed in a circular shape. Here, the radius from the center of the circular closed region to the bottleneck center is denoted as R, and the angle between the center of a metallic nanoparticle and the center of the adjacent metallic nanoparticle is denoted as α. Note that the metallic nanoparticle may be formed not only in a circular shape but also in a triangular shape, a rhomboid shape, a square shape, or the like. Moreover, the resonance absorption wavelength of the metallic nano-chain is determined by the size of the closed region, i.e., the radius R.

Figure 11:
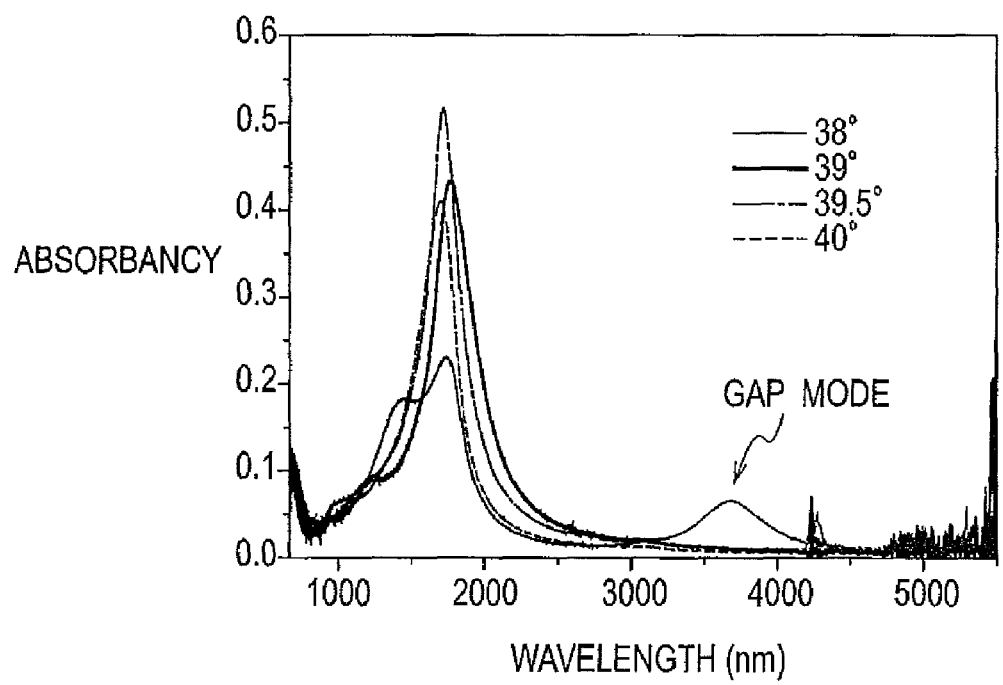
FIG. 11 is a view showing, in the case where a metallic nano-chain has a circular linked structure, differences in the absorbancy when the link is a closed region and when the link has a gap.
Figure 13:
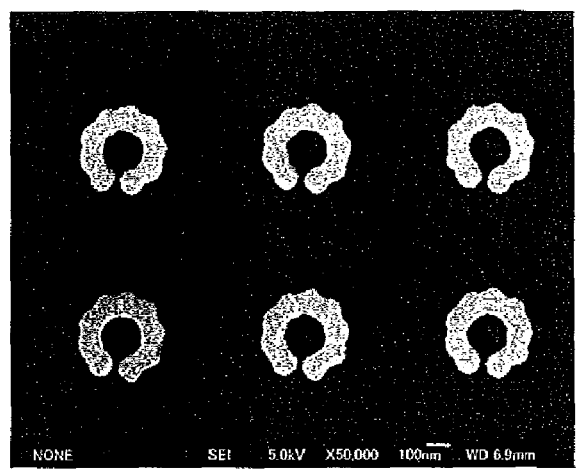
FIG. 13 is a view showing the shot data when the shape of a metallic nano-chain does not form a closed region but has a gap.

FIG. 11 shows a relationship between the resonance absorption wavelength (nm) and the absorbancy when the overlapping portion of the bottleneck is gradually made larger (i.e., α is varied from 40 degrees to 39.5 degrees, 39 degrees, and 38 degrees) in the configuration of FIG. 10 while maintaining the circular shape of the link. When the angle α is large, the overlapping portion of the bottleneck is small and the region surrounded by the metallic nanoparticles that are mutually linked with the bottlenecks still maintains the closed region, however, when α reaches 38 degrees, as shown in FIG. 13, a gap will occur between some of the metallic nanoparticles and the closed region cannot be formed anymore. Then, not only a peak occurs at a predetermined absorption wavelength but also an absorption peak called a gap mode occurs in other wavelength regions, which is seen in the absorption spectrum when a shown in FIG. 11 is 38 degrees. Therefore, in the case where the metallic nano-chain forms a closed region, the light collection efficiency due to the resonance absorption is improved more than the case where there is a gap in the metallic nano-chain. When the metallic nano-chain forms a closed region, the light collection efficiency reaches as high as 70%.

Figure 12:
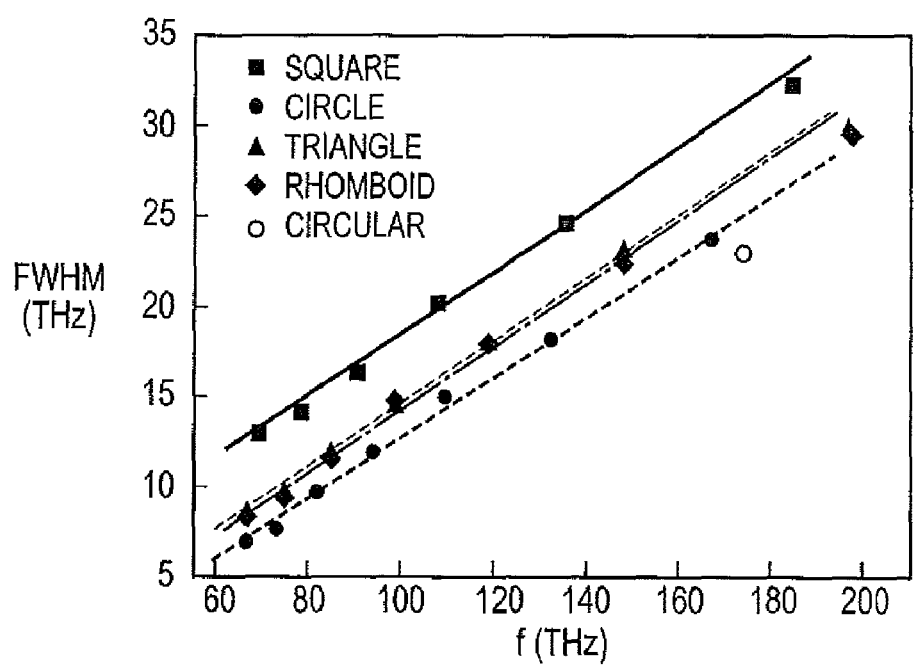
FIG. 12 is a view showing data when the metallic nano-chain has a circular closed region is added to the data of FIG. 6.

On the other hand, FIG. 12 is a view of the same graph as that of FIG. 6 adding the data indicated by an open circle. The data indicated by the open circle corresponds to the measurement of the FWHM of the spectrum of the resonance absorption frequency of the circular closed region that is formed by using the circular metallic nanoparticles as in FIG. 10. As apparent from the view, the FWHM has been improved more and the spectral width becomes smaller as compared with the data indicated by the filled circle in the case where a plurality of circular metallic nanoparticles are arranged on a straight line. Therefore, the wavelength resolution has been improved significantly than at least that of the metallic nano-chain having a plurality of square-shaped metallic nanoparticles arranged on a straight line.

Figure 14:
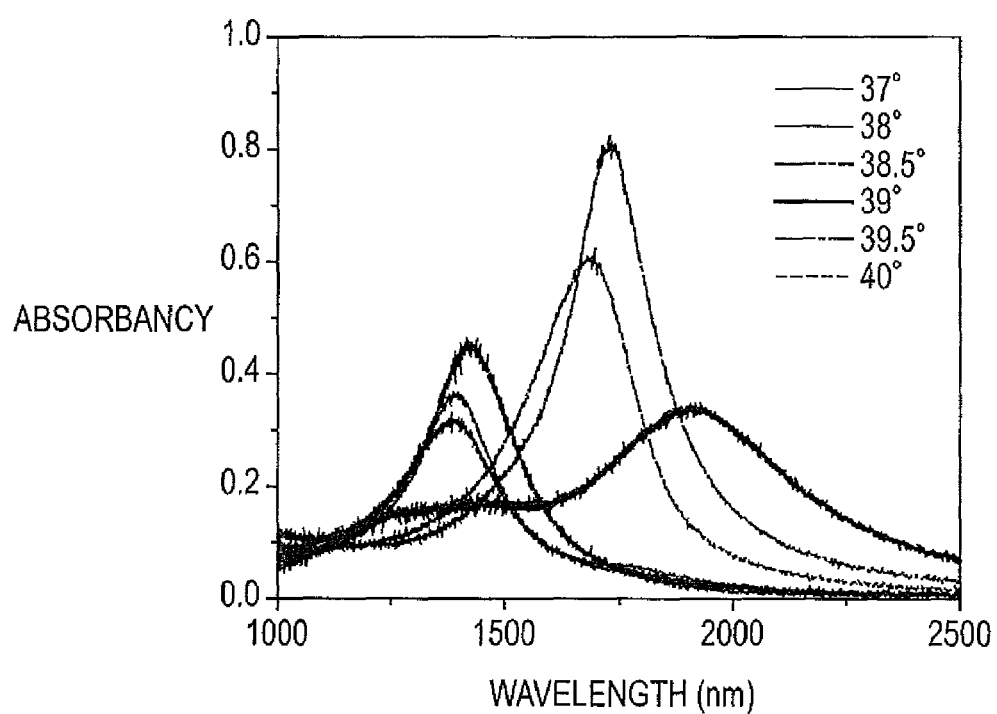
FIG. 14 is a view showing the polarization dependency of a metallic nano-chain.
Figure 15:
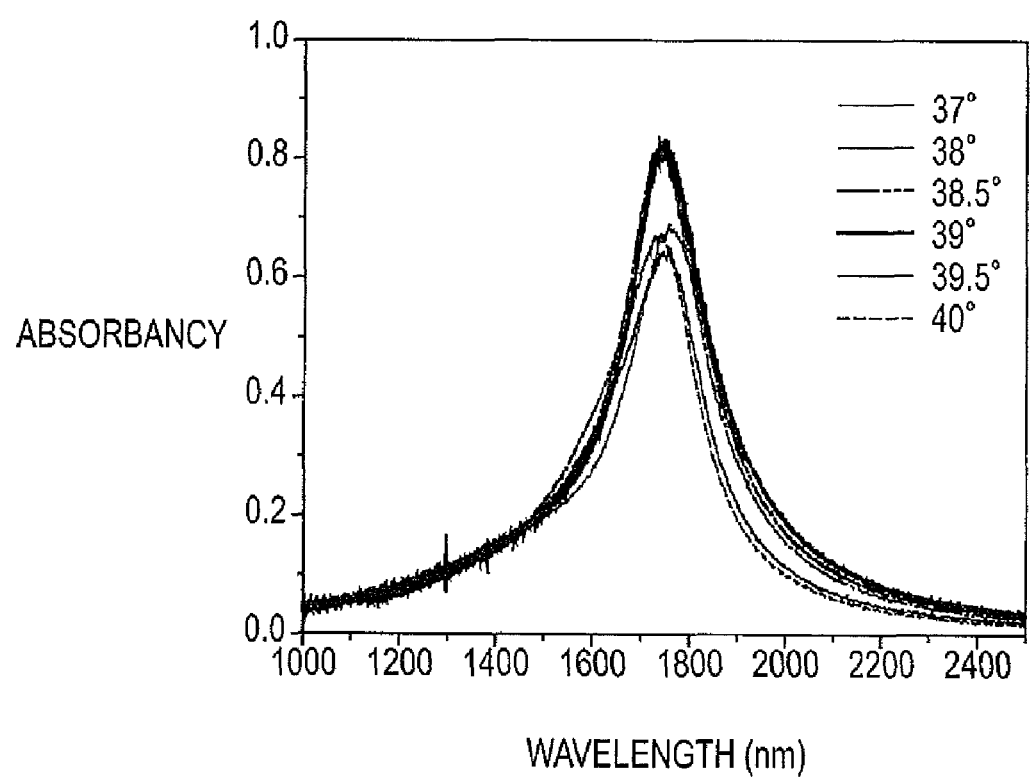
FIG. 15 is a view showing the polarization dependency of a metallic nano-chain.

Moreover, the advantages when the metallic nano-chain forms a closed region reside also in not having polarization dependency but having isotropy. FIG. 14 and FIG. 15 show the isotropic data. FIG. 15 shows a relationship between the absorption wavelength (horizontal axis) and the absorbancy (vertical axis) when the structure of FIG. 10 or FIG. 13 is irradiated with a vertically polarized wave. In this case, there is no particular change between when the metallic nano-chain maintains the closed region and when it has a gap. FIG. 14 shows a relationship between the absorption wavelength (horizontal axis) and the absorbancy (vertical axis) when the structure of FIG. 10 or FIG. 13 is irradiated with a horizontally polarized wave. In this case, there is a significant shift particularly in the peak wavelength when the metallic nano-chain has a gap (corresponding to the curves of 37 degrees, 38 degrees, and 38.5 degrees).

Next, an embodiment of a photodetector of the present invention is described. FIG. 19A shows a plan view (top view) of the photodetector of the present invention, and FIG. 19B shows a cross sectional view of FIG. 19A.

A photodetection unit including a current detection probe 21, a nano-chain unit 22, and a current detection probe 23 is arranged on a substrate 24. The nano-chain unit 22 is a metallic structure with plasmon resonance absorption, wherein a plurality of metallic nanoparticles 22a are mutually linked with bottlenecks. Here, the bottleneck indicates a portion where parts of the metallic nanoparticles 22a are overlappingly formed as described in FIG. 2 or FIG. 3B. That is, one nanoparticle 22a is slightly overlapped with an adjacent nanoparticle 22a, thereby allowing a free electron contained in the one nanoparticle to move to the adjacent nanoparticle to a certain extent.

Moreover, the material of the metallic nanoparticle 22a may be of any metal that provides surface plasmon absorption by being a nanoparticle, and the examples thereof include noble metals, such as gold, silver, and platinum. Moreover, the metallic nanoparticle 22a may be a nano-substance made from other material coated with such metal.

As described above, in the nano-chain unit 22, a plurality of metallic nanoparticles 22a are mutually linked with bottlenecks. Moreover, if there are a plurality of bottlenecks (i.e., no less than three metallic nanoparticles are linked), the respective bottleneck centers are preferably arranged on a straight line, as described in the paragraph about the metallic structure. The bottleneck centers arranged on a straight line would facilitate the movement of a free electron between the microparticles through the respective bottlenecks.

The shape of the metallic nanoparticle 22a to be linked comprises, for example, such shapes shown in FIGS. 2(a) to 2(d), and is rectangular parallelepiped, for example, although not limited in particular. When the shape of the metallic nanoparticle is rectangular parallelepiped, the bottleneck is preferably formed by linking the metallic nanoparticles at their edge lines. Thereby, the neck width of the bottleneck can be reduced easily.

When viewed from vertically above with respect to the substrate, that is in a plan view, as in FIGS. 2(a), 2(c), and 2(d), it is preferable that the metallic nanoparticle be polygonal and have a corner. Furthermore, the shape of the metallic nanoparticle to be linked is preferably the rectangular parallelepiped having the surfaces with a square shape and a rectangular shape as shown in FIGS. 2(a), 2(d), and the surface of the square shape is preferably arranged so as to be equal in level to the substrate surface. In other words, as in FIG. 2(a), it is preferable that the metallic nanoparticle looks square in a plan view.

The volume of deposition of the metallic nanoparticle to be linked is preferably in the order of 100,000 nm$^3$ to 1,000,000 nm$^3$. Furthermore, the area of the metallic nanoparticle when viewed from the upper surface of the substrate is preferably in the order of 5,000 nm$^2$ to 20,000 nm$^2$. Moreover, the height of the metallic nanoparticle from the substrate is preferably in the order of 10 to 100 nm.

The number of metallic nanoparticles to be linked is preferably in the order of 2 to 50. Since the absorption resonance wavelength is proportional to the number of metallic nanoparticles, the number of metallic nanoparticles to be linked (the length of a metallic body extending through the bottlenecks) may be suitably selected in accordance with a desired resonance absorption wavelength.

Next, although the substrate 24 may be a substrate capable of arranging the metallic nanoparticles 22a therein, the substrate 24 is preferably a solid substrate, wherein at least the surface in which the metallic nanoparticles 22a are arranged is made of an insulator. Since this substrate is used as the photodetector, the substrate is preferably made from a material that does not absorb light (e.g., light in the visible region to the near infrared region) incident from the outside, for example comprising a transparent substrate. Since the nano-chain unit 22 is manufactured using the semiconductor fine processing technique (e.g., electron beam lithography, sputtering, or the like) as shown in FIG. 16, the substrate needs to withstand these processings. Accordingly, for example, a glass substrate, a quartz substrate, a sapphire substrate, or the like is used as the substrate 24.

Figures 16, 17:
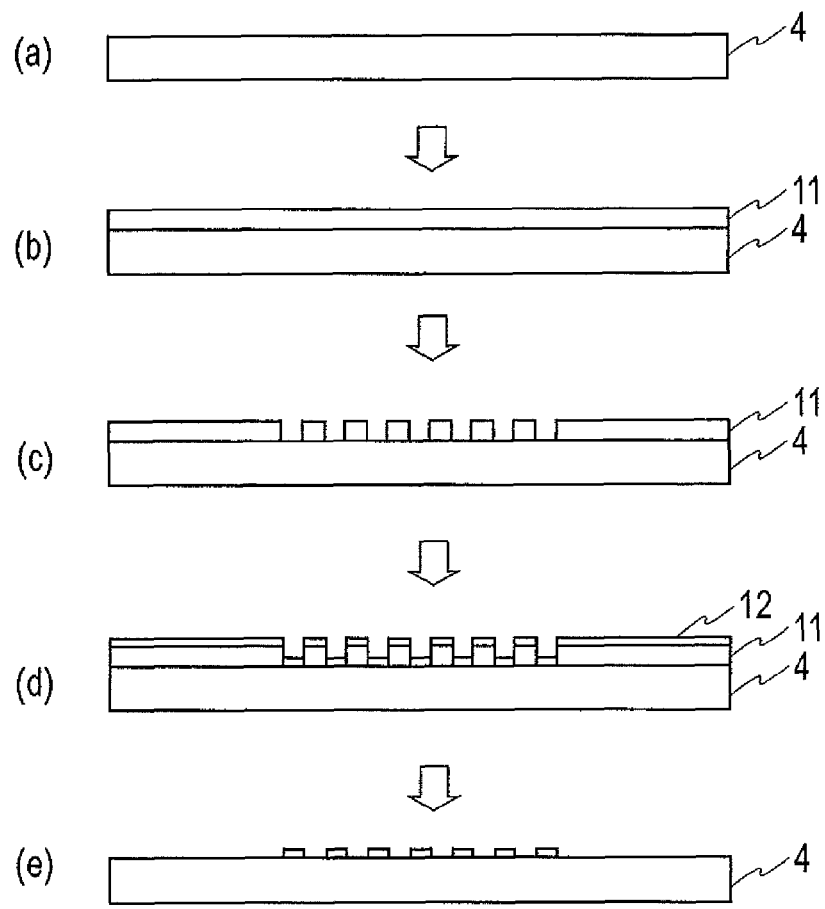
FIG. 16 is a view showing an example of the steps of manufacturing a metallic nano-chain.
FIG. 17 is a view showing a relationship between the number of metallic nanoparticles and the length of a metallic nano-chain.

For the manufacturing method when forming the nano-chain unit 22 on the substrate 24, the nano-chain unit 22 is fabricated using the already-described manufacturing method of FIG. 16.

A plurality of bottlenecks in the linked metallic nanoparticles are preferably arranged on a straight line as described above, however, as shown in FIG. 3A, the overall length X of the nano-chain unit 22 on this straight line is set in accordance with a resonance wavelength. As apparent from FIG. 17, FIG. 18, and the like, the length X of the nano-chain unit 22 is adjusted in accordance with the size of a metallic nanoparticle to be linked, the number of metallic nanoparticles to be linked, or the like. If the length of the nano-chain unit 22 is lengthened, the plasmon resonance absorption wavelength of the metallic structure will shift to the long wavelength side. Since this point has been described in conjunction with FIG. 17, FIG. 18, the another description thereof is omitted here.

The wavelength of light to be absorbed can be varied by varying the length X of the nano-chain unit 22, and the application of this knowledge allows for detection of light.

On the other hand, the current detection probes 21, 23 are formed from a metallic pattern and comprise, for example, a metal multilayer which is formed by forming Cr (chromium) with the film thickness of 5 nm on the substrate 24 and then depositing Au (gold) with the film thickness of 40 nm on the Cr. The metallic nanoparticle 22a is formed in a polygonal shape, and is square in this embodiment. These current detection probes 21, 23 are formed by sputtering or vapor deposition.

Moreover, each of the current detection probes 21, 23 has a corner portion whose tip is formed with a predetermined angle, and this corner portion is arranged so as to face a corner of the metallic nanoparticle 22a present at the tip of the nano-chain unit 22. In FIGS. 19A, 19B, the current detection probe 21 constitutes a probe on the negative electrode side, and the current detection probe 23 constitutes a probe on the positive electrode side. However, instead of arranging one probe for the positive electrode and one probe for the negative electrode as in FIGS. 19A, 19B, a plurality of probes may be arranged for each of the positive/negative electrodes to detect the current.

Figure 20:
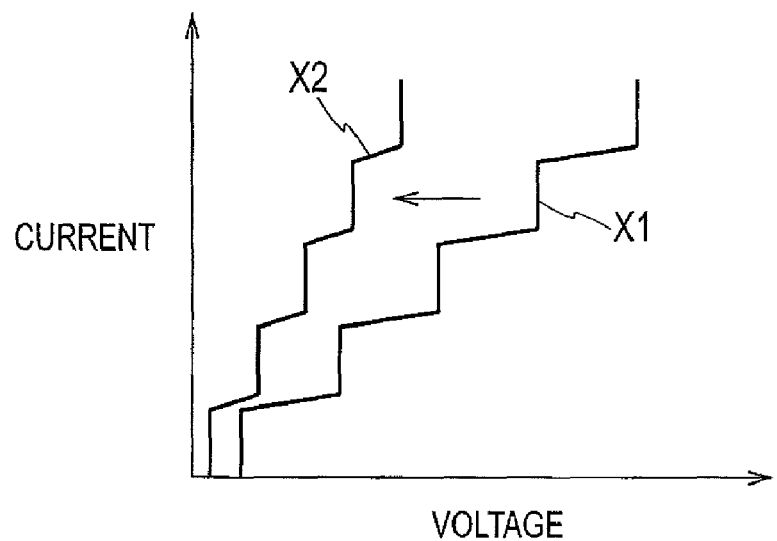
FIG. 20 is a schematic view showing current-voltage characteristic when the photodetector shown in FIG. 19A

Moreover, the gap width t between the corner portions of the current detection probes 21, 23 and the corner of the metallic nanoparticles 22a at the tip of the nano-chain unit 22 is formed in the range of 0<t≦10 (nm). This gap may be present at least between the current detection probe 21 and the metallic nanoparticle at one end of the nano-chain unit 22 or between the current detection probe 23 and the metallic nanoparticle at the other end of the nano-chain unit 22. In other words, the current detection probes 21, 23 and the nano-chain unit 22 just need not to be completely short-circuited to each other. Accordingly, for example, if the gap width t between the current detection probe 21 and the metallic nanoparticle at one end of the nano-chain unit 22 is formed in the range of 0<t≦10 (nm), then the gap width t between the current detection probe 23 and the metallic nanoparticle at the other end of the nano-chain unit 22 is formed in the range of 0≦t≦10 (nm). Here, a power supply 26 and a resistor 25 are coupled in series between the current detection probes 21 and 23. A DC power supply is used as the power supply 26. While the nano-chain unit 22 is not receiving light, the voltage V of the DC power supply 26 is varied to detect the current I that flows between the current detection probes 21, 23, and the current-voltage characteristic (I-V characteristic) is measured. Then, the characteristic such as X1 of FIG. 20 is obtained. Although schematically drawn here, the current-voltage characteristic draws almost a staircase pattern.

Since the current detection probes 21, 23 and the nano-chain unit 22 have a gap therebetween and are not short-circuited to each other, a current will not flow. However, a current will flow if the applied voltage exceeds a certain voltage. On the other hand, if the nano-chain unit 22 is irradiated with light, the plasmon resonance absorption at a wavelength corresponding to the length X of the nano-chain unit 22 is carried out and the polarization will occur. This will change the amount of current flowing at a certain voltage. Therefore, by observing the increase and decrease in the amount of current, an increase and decrease in the light intensity of a wavelength at which the resonance absorption is being carried out is detected.

Figure 21:
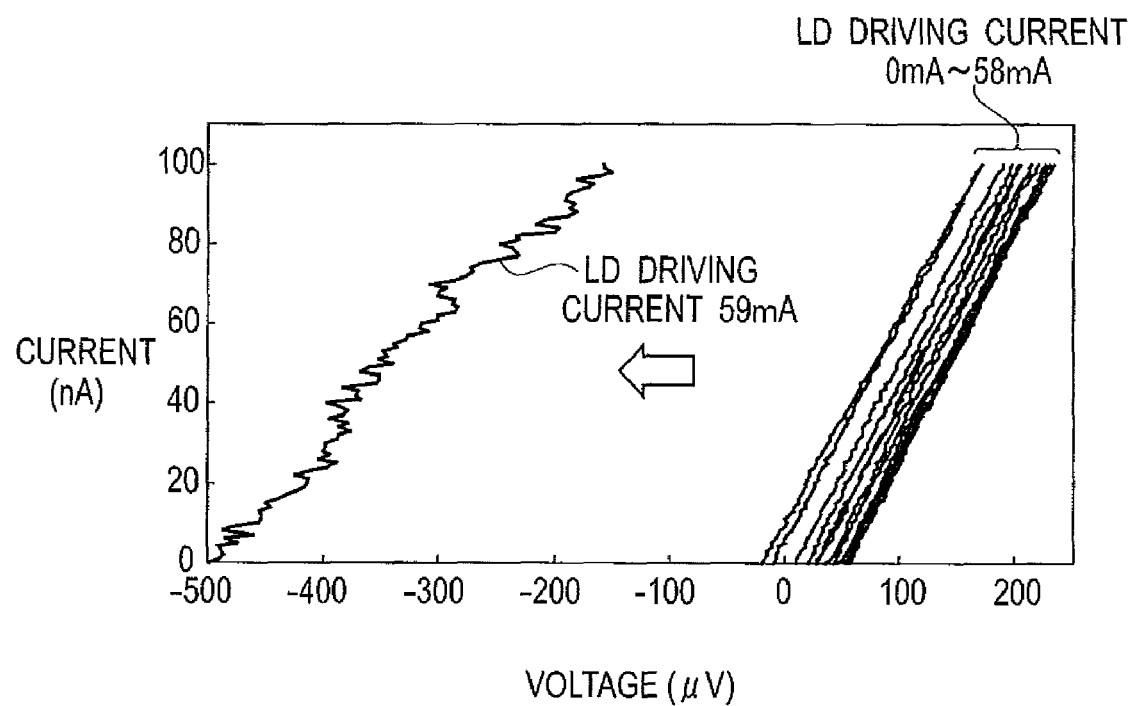
FIG. 21 is a view showing I-V characteristics when a gap between the current detection probes and a nano-chain unit is irradiated with a laser beam.
Figure 22:
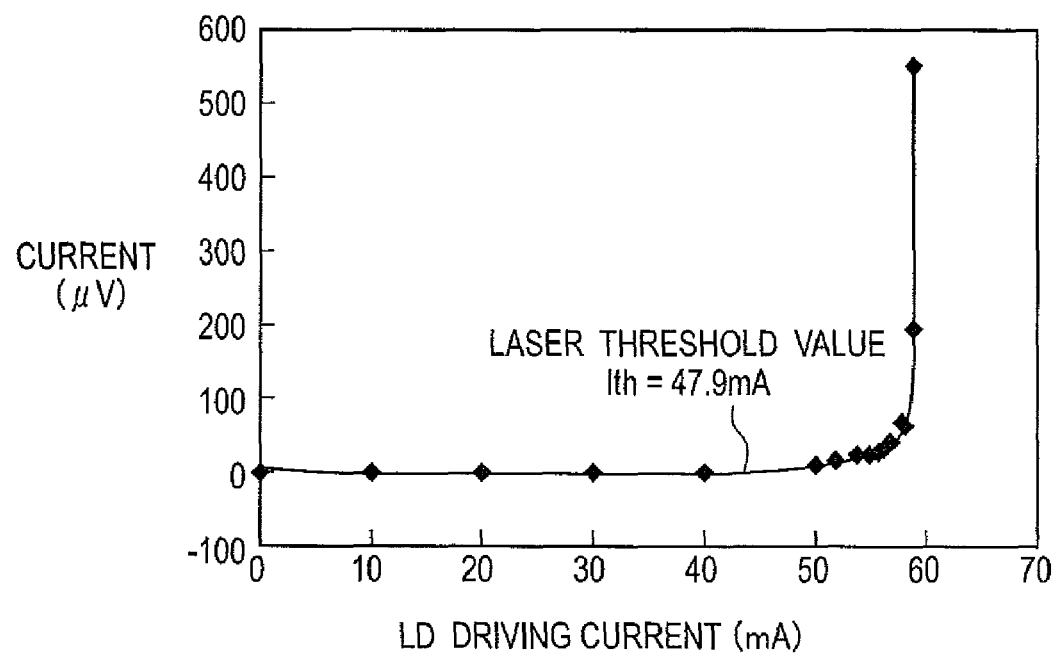
FIG. 22 is a view showing a change when converting the data of FIG. 21 to a relationship between the LD driving current and the initial voltage.
Figure 23:
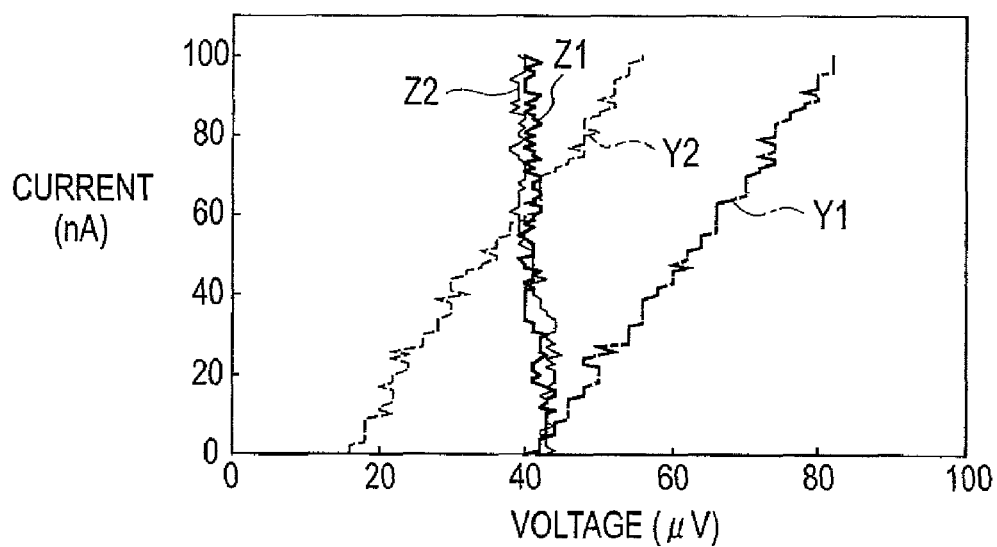
FIG. 23 is a view showing the I-V characteristics when being irradiated with the light of a light source lamp and when not being irradiated, respectively.

FIG. 21, FIG. 22, and FIG. 23 show the results of this experiment. In FIG. 21, a photodetector such as the one in FIGS. 19A, 19B was fabricated, and the length X of the nano-chain unit 22 was adjusted to set the plasmon resonance absorption near the wavelength of 1,000 nm. Then, the current detection probe 23 and the tip on the right side of the nano-chain unit 22 were short-circuited to each other, and the gap between the nano-chain unit 22 and the current detection probe 21 was irradiated with a laser beam having a wavelength of about 1,000 nm to measure how the current-voltage characteristic fluctuates.

It is shown in FIG. 21 that, as the driving current for driving the laser is varied, the initial voltage V0, at which a current starts to flow between the current detection probes 21, 23, will abruptly decrease (shift to the left side in the view) when the laser driving current becomes 59 mA or more. FIG. 22 is a graph showing the relationship between the LD driving current and the initial voltage V0 of FIG. 21. Note that the initial voltage V0 in the vertical axis of FIG. 22 represents the value obtained by reversing the positive/negative sides of the voltage axis of FIG. 21, and here the upper in the vertical axis, the smaller the value of the initial voltage V0 becomes.

The initial voltage V0 remains approximately 0 μV until the laser driving current reaches the laser threshold current of 47.9 mA at which the laser oscillation starts. However, the initial voltage V0 starts to decrease around when the laser driving current exceeds the laser threshold current of 47.9 mA, and the initial voltage V0 abruptly fluctuates largely when the laser driving current reaches near 60 mA. In this way, immediately after the oscillation of the laser beam starts, the fluctuation in the initial voltage V0 also increases in accordance with the intensity of the laser beam.

On the other hand, the photodetector of FIGS. 19A, 19B was configured the same as in the above-described experiment with the laser irradiation and then the current-voltage measurement was carried out under irradiation of light from a light source lamp to obtain the result of Y2 of FIG. 23, while the result of the current-voltage measurement under no irradiation by turning off the light source lamp is Y1 of FIG. 23.

The curve Y2 under irradiation of light has a smaller initial voltage, at which a current starts to flow, than Y1, and the graph as a whole also has shifted to the left. Incidentally, when the circuit of FIGS. 19A, 19B is short-circuited by short-circuiting the nano-chain unit 22 and the current detection probe 21 and short-circuiting the nano-chain unit 22 and the current detection probe 23, the current-voltage characteristic under irradiation of the light of the light source lamp is represented by Z2, while the current-voltage characteristic under no irradiation of the light of the light source lamp is represented by Z1. In this way, when the circuit is short-circuited, there is little change in the current-voltage characteristic regardless of being irradiated with light or not. As apparent from the above, light irradiation causes a potential difference in the gap.

Figure 24A:
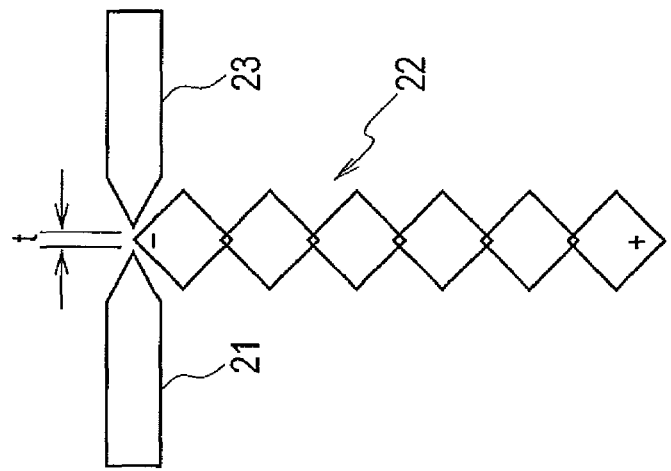
FIG. 24A to FIG. 24C are views showing examples of the arrangement of current detection probes on the positive electrode and negative electrode and a nano-chain unit.
Figure 24B:
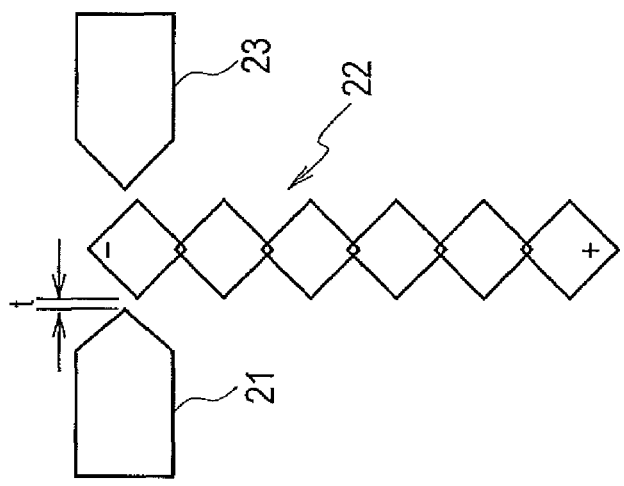
Figure 24C:
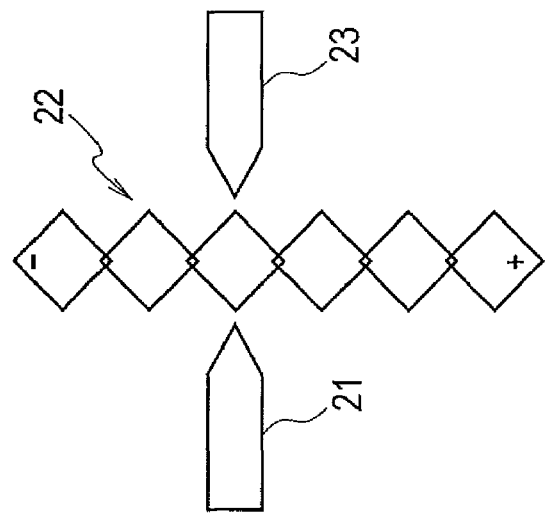

FIG. 24A to FIG. 24C show modifications of the arrangement of the current detection probes 21, 23 on the positive electrode and negative electrode sides and the nano-chain unit 22. In FIG. 24A, the tip corner of the metallic nanoparticle 22a at the end of the nano-chain unit 22 is arranged so as to be sandwiched by the current detection probes 21, 23. The gap width t between the current detection probes 21, 23 is formed in the range of 0<t≦10 (nm) as described above.

In FIG. 24B, the current detection probe 21 is arranged facing one (one side surface) of two opposing corners of the metallic nanoparticle 22a at the end of the nano-chain unit 22, while the current detection probe 23 is arranged facing the other corner. In this case, at least one of the gap width t between the metallic nanoparticle 22a and the current detection probe 21 and the gap width t between the metallic nanoparticle 22a and the current detection probe 23 is formed in the range of 0<t≦10 (nm), and the other gap width t is formed in the range of 0≦t≦10 (nm). In FIG. 24C, the arrangement of the current detection probes 21, 23 in FIG. 24B has been moved to the corner of the metallic nanoparticle 22a in the center part of the nano-chain unit 22.

Incidentally, in the configuration of FIGS. 19A, 19B, one set of photodetection unit including the current detection probe 21, the nano-chain unit 22, and the current detection probe 23 is arranged on the substrate 24. However, a photodetector capable of detecting various wavelengths at one time can be configured by arranging a plurality of nano-chain units 22 on a substrate, in which each of the nano-chain units 22 has its overall length varied, and a pair of positive/negative current detection probes arranged thereto.

Although the planar shape of the metallic nanoparticle in the nano-chain unit 22 is square in the above-described embodiments, the metallic nanoparticle can be formed in other shape. As described in the metallic structure of the present invention, the metallic nanoparticles of FIG. 1A to FIG. 1C may be used. The planar shape of each of the metallic nanoparticles is formed in a circular shape in FIG. 1A, in an isosceles triangle shape in FIG. 1B, and in a rhomboid shape in FIG. 1C. When these shapes are used, the nano-chain unit will have the operational effects described in the above metallic structures.

In this way, the present invention includes various kinds of embodiments that have not been described here, of course. Accordingly, the technical scope of the present invention shall be defined only by the appended claims that are appropriate from the above description.

What is claimed is:

1. A photodetector comprising:
 a plurality of metallic nanoparticles formed in any one of a circular shape, a triangle shape and a rhomboid shape;
 a nano-chain unit having the plurality of metallic nanoparticles mutually linked with a plurality of bottlenecks; and
 a photodetection unit having a positive and a negative current detection probes arranged on a substrate, wherein
 the nano-chain unit with plasmon resonance absorption is sandwiched between the positive and the negative current detection probes.

2. The photodetector according to claim 1, wherein
 both ends in a length direction of the nano-chain unit are sandwiched between the positive and the negative current detection probes, and
 a metallic nanoparticle at one end of the nano-chain unit and a tip of at least one of the current detection probes are arranged with a predetermined, gap therebetween.

3. The photodetector according to claim 1, wherein a tip of a metallic nanoparticle at one end of the nano-chain unit is arranged so as to be sandwiched between the positive and the negative current detection probes with a predetermined gap therebetween.

4. The photodetector according to claim 1, wherein
 both sides of either one of the metallic nanoparticles of the nano-chain unit are sandwiched between the positive and the negative current detection probes, and
 at least one of the current detection probes and one side surface of the metallic nanoparticle are arranged with a predetermined gap therebetween.

5. The photodetector according to claim 1, wherein a predetermined voltage is applied between the positive and the negative current detection probes.

6. The photodetector according to claim 1, further comprising a plurality of photodetection units formed to have different absorption wavelengths of plasma resonance absorption caused by their respective nano-chain units.

* * * * *